United States Patent

Brown

[15] 3,678,199

[45] July 18, 1972

[54] VERTICAL LOCKING CIRCUIT

[72] Inventor: Buck C. Brown, Rockville, Md.

[73] Assignee: Control Concepts Corporation, Rockville, Md.

[22] Filed: March 18, 1971

[21] Appl. No.: 125,769

[52] U.S. Cl. .......................................178/69.5 TV, 328/139

[51] Int. Cl. .......................................................H04n 5/04

[58] Field of Search............178/69.5 TV; 307/234; 328/111, 328/112, 119, 139

[56] References Cited

UNITED STATES PATENTS 3,069,499 12/1962 Jones.............................178/69.5 TV

*Primary Examiner*—Robert L. Griffin
*Assistant Examiner*—George G. Stellar
*Attorney*—Pennie, Edmonds, Morton, Taylor & Adams

[57] ABSTRACT

A circuit for deriving accurate vertical time reference signals for locking or driving television apparatus, e.g., synchronization generators, to a composite video signal. The circuit also reduces errors due to noise, and permits vertical timing advances of up to two horizontal timing increments. The pulses of a synchronized pulse train each initiates the generation of a continuous ramp function which returns to its initial potential when the initiating pulse ends. If the sync pulse has a sufficient duration such as is characteristic of the vertical sync pulses, the ramp function will reach a threshold level. A comparator in response to the ramp function reaching a threshold level initiates a pulse and, when the ramp function returns to its initial potential, terminates the pulse. This threshold derived pulse is delivered to a flip-flop which changes state at the termination time. The flip-flop produces a pulse having a leading edge coincident with the trailing edge of the ramp function, the threshold pulse, and consequently with the trailing edge of the vertical sync pulses. The threshold pulse is also fed to a mono-pulse generator which produces a signal having a duration equal to or greater than the vertical sync interval or three horizontal time increments. A counter consisting of the aforementioned flip-flop and two additional flip-flops counts six pulses fed thereto by the comparator after which it generates an output pulse. The pulses from the counter and the mono-pulse are fed to an "and" circuit which gates the pulse only if both the mono-pulse and the counter output are simultaneously inputs. The leading edge of the pulse from the "and" gate is coincident with the trailing edge of the last vertical sync pulse. Thus, this edge defines an accurate time to which the television apparatus may be locked or driven.

6 Claims, 3 Drawing Figures

INVENTOR
BUCK C. BROWN
BY
Pennie, Edmonds, Morton, Taylor & Adams
ATTORNEYS

INVENTOR
BUCK C. BROWN

BY
Pennie, Edmonds, Morton, Taylor & Adams
ATTORNEYS

VERTICAL LOCKING CIRCUIT

BACKGROUND OF THE INVENTION

This invention relates to a means for accurately providing vertical time references for locking television apparatus to an applied television synchronization signal.

In the past television equipment, including monitors, receivers, sync generators, test generators, etc. have been synchronized in the vertical time domain to the incoming television signal by means of an integrating circuit. Such a circuit would integrate the six vertical sync pulses of the composite television signal thereby generating a rising signal which upon reaching a threshold level was detected. A pulse was then generated which defined the vertical time position to which the equipment locked. However, this means of synchronizing two signals is inherently less accurate than the means described herein and is highly susceptible to noise error. Thus, for example, if there were noise spikes in the vertical sync pulse train, this noise was integrated thereby causing the threshold level to be reached sooner or later than desired depending on the noise level. Also noise components with durations comparable to the vertical interval would produce completely erroneous synchronization. Thus, the equipment would not be accurately synchronized with the sync signal..

This deficiency could be overcome by averaging the time at which the integrated signal reached the threshold level over a large number of vertical sync intervals. Thus, the effect of noise perturbations would hopefully be minimized. This, however, would result in the apparatus establishing synchronization with the reference signal only after a relatively large time interval thereby causing the picture to roll until synchronization was achieved.

It, therefore, is an object of the invention to provide accurate vertical time references for locking a signal to an applied signal within a relatively short time interval.

It is another object of this invention to reduce the affect of noise on a vertical synchronization locking circuit.

It is yet another object of this invention to provide time references within the vertical interval of a television sync signal, each reference being separated by increments of one horizontal sync interval.

SHORT STATEMENT OF THE INVENTION

Accordingly, this invention relates to a circuit for generating an accurate vertical time reference for locking the phase of a television synchronizing signal to that of an applied television synchronizing signal. First, the synchronizing pulses are separated from a composite video signal by conventional means. The resultant synchronizing pulses (arbitrarily assumed negative) are applied to a ramp generator circuit. The circuit generates a ramp function each time a remote input sync signal goes negative. The generated ramp function returns to its initial potential when the negative going input sync pulse returns to reference potential. If the input synchronizing pulses have a sufficient duration such as are characteristic of vertical synchronizing pulses, each generated ramp signal will reach a threshold level at which time a corresponding pulse is generated. The trailing edge of each generated pulse is coincident with the trailing edge of the remote synchronization pulse. The generated pulses are each fed to both a counter and a mono-pulse generator. The counter divides by six and delivers a pulse to an "and" gate. The first of the generated pulses initiates the mono-pulse generator which delivers a rectangular pulse having a duration equal to or greater than the vertical sync interval. The "and" gate passes the pulse from the counter when the mono-pulse signal and the counter pulse are simultaneously applied to its input. This output pulse has a leading edge that is coincident in time with the trailing edge of the synchronizing pulse and thus establishes a time position to which the local sync generator is locked.

BRIEF DESCRIPTION OF THE DRAWINGS

The various objects, advantages and features of this invention will be more fully understood from the following detailed description, appended claims and accompanying drawings in which:

DETAILED DESCRIPTION OF THE PREFERRED EMBODIMENT

Figure 1:
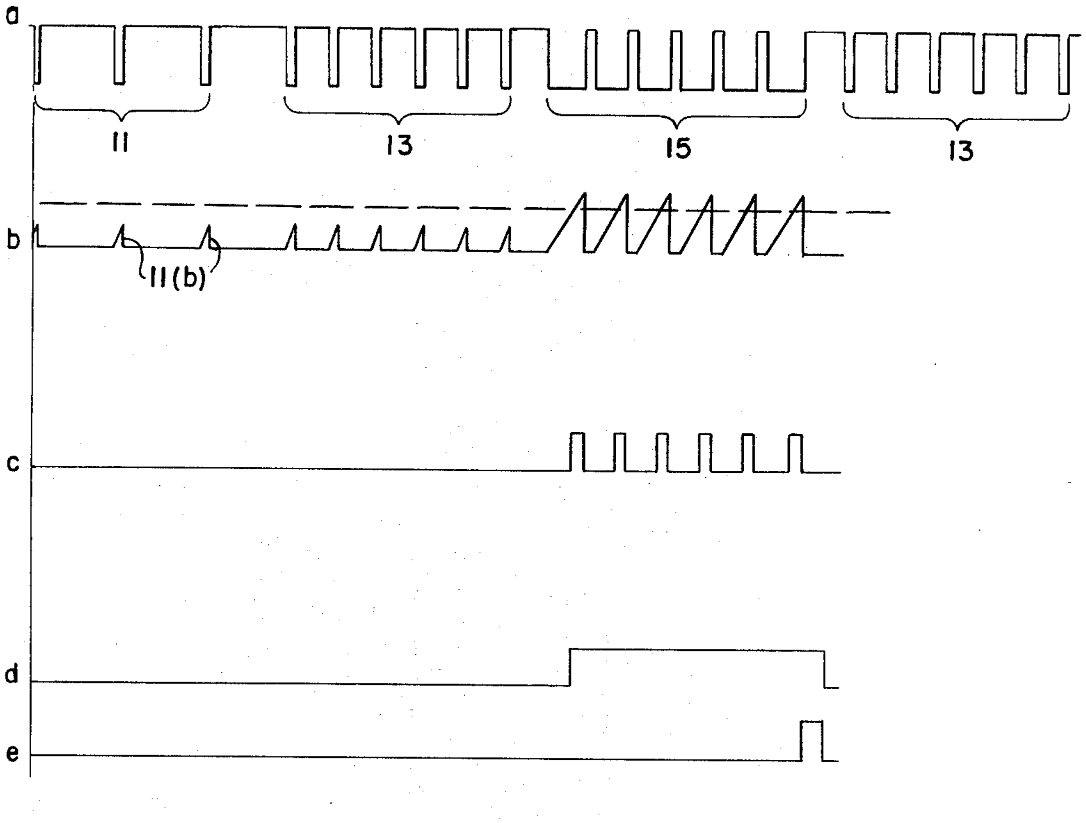
FIG. 1 is a set of waveforms associated with the circuit of this invention.

Referring to FIG. 1, the waveform (*a*) shows (not necessarily to scale) a television synchronization signal during the vertical synchronizing interval. Each such sync interval includes negative horizontal sync pulses 11, equalizing pulses 13, and vertical sync pulses 15. The equalizing pulses 13 function to maintain uniform response to the vertical sync pulse during the alternate fields of a picture. The leading edges of the vertical sync pulses 15 maintain horizontal synchronization of the receiver during the vertical synchronizing interval. The negative going vertical sync pulses maintain the received picture in vertical synchronization.

The horizontal sync pulses are approximately 63.5 microseconds apart and have a duration of typically 5 microseconds. The equalizing pulses occur before and after each vertical sync pulse and at twice the rate of the horizontal sync pulse, i.e., 31.75 microseconds apart. The pulse width of the equalizing pulses is approximately one-half the width of the horizontal sync pulses. In contrast, the vertical sync pulse has approximately a 27 microsecond duration. Each vertical interval contains 6 vertical sync pulses separated by serrations each of which is approximately the width of a horizontal sync pulse with each of the serrations being approximately 31.5 microseconds apart.

Figure 2:
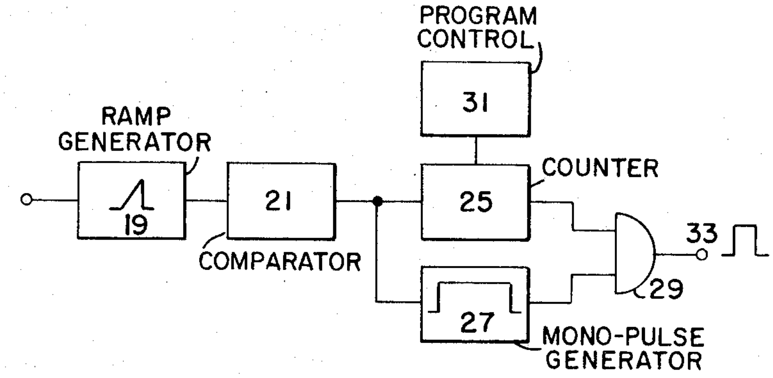
FIG. 2 is a block diagram of the circuit of this invention.

Refer now to FIG. 2 which shows a block diagram of the preferred embodiment of the invention. The incoming synchronizing signal as illustrated in FIG. 1(*a*) is delivered to input 17 of ramp function generator 19. When the input sync signal goes negative with respect to reference potential, the ramp function generator initiates generation of a continuous signal having a constant slope. The generator continues to generate the ramp function until the input sync signal returns to reference potential. At this time the generator ceases to generate the ramp function and the signal drops rapidly to 0 volts. The output from the ramp generator 19 is fed to a comparator 21 which determines when the potential of the ramp function equals a predetermined level. When this occurs comparator 21 initiates a pulse. When the ramp function returns to 0 volts the comparator terminates the pulse. Thus a pulse is generated having a duration equal to the time in which the ramp function is above a threshold level and more importantly, as will be explained hereinafter, the trailing edge of the generated pulse is coincident with the trailing edge of the ramp function; and consequently with the trailing edge of the negative going input synchronizing signal.

The pulses produced by comparator 21 are delivered to a counter 25 which serves as a divider and also to a mono-pulse generator 27. The pulse enters mono-pulse generator 27 and initiates a pulse having a duration equal to or greater than the vertical sync pulse interval or approximately three horizontal time increments (3H). Generator 27 may be a monostable multivibrator or any other circuit for generating a waveform having a duration which is equal to or slightly greater than 3H. Counter 25 can be programmed to count 2, 4 or 6 pulses received from comparator 21 before it delivers an output to an "and" gate 29. For example, if counter 25 is programmed to count 6 pulses, the counter will count the first six pulses received from comparator 21 before it delivers an output pulse to "and" gate 29. The program control circuit 31 provides the required signal to set the counter cycle to 2, 4 or 6 counts at the end of which the counter is reset. "And" gate 29 delivers the output pulse from counter 25 to output terminal 33 when both a counter output pulse and the pulse from generator 27 are simultaneously applied thereto.

Refer again to FIG. 1 where waveform 1(*b*) shows the output of ramp function generator 19. Each negative going horizontal sync pulse 11 produces a corresponding ramp signal 11(*b*). The ramp signal rises with a constant slope until the horizontal sync signal returns to reference potential. Since the horizontal sync pulses 11 have a relatively short time duration, the ramp signal never rises to a substantial potential. In a similar manner, each of the equalizing pulses on each side of the vertical sync pulse cause generator 19 to generate corresponding ramp functions which rise with a constant slope but do not achieve a substantial potential because of the relatively short time duration of the equalizing pulses.

The serrated vertical sync pulses, however, have a substantial time duration between each serration. Thus, as shown in 1(*b*) the ramp signals caused to be generated by the vertical sync pulses rise to a relatively large potential. A threshold potential indicated by the dotted line is chosen such that it is greater than the peak ramp signal caused by the horizontal and equalizing pulses but which is somewhat below the peak ramp potential generated by the vertical sync pulse. The threshold potential is compared with the ramp function potential in comparator 21 and when the ramp function goes above the threshold potential, a pulse is generated with a step output function as shown in FIG. 1(*c*). When the ramp function drops to 0 volts, the comparator terminates the pulse and produces a step drop in voltage at the output of the comparator. As can be seen by examining FIG. 1(*b*) and (*c*), the trailing edges of the generated pulses are identical timewise with the trailing edges of the ramp functions and consequently with the trailing edges of the negative going sync pulses. In addition, the last pulse has a trailing edge coincident with the trailing edge of the vertical sync pulse 15.

FIG. 1(*d*) shows the output of mono-pulse generator 27. This output is initiated by the leading edge of the first pulse generated by comparator 21 and lasts for approximately three horizontal time intervals (the duration of the set of vertical sync pulses). FIG. 1(*e*) shows the output from counter 25 when it is programmed to count to six. When the signals shown in FIGS. 1(*d*) and 1(*e*) are fed to "and" circuit 29, an output will appear at terminal 33 identical timewise to that shown in FIG. 1(*e*). Thus, it can be seen that the leading edge of the waveform of FIG. 1(*e*) is coincident to the trailing edge of the vertical sync pulse 15. (A count is produced by the trailing edge of each comparator pulse).

Figure 3:
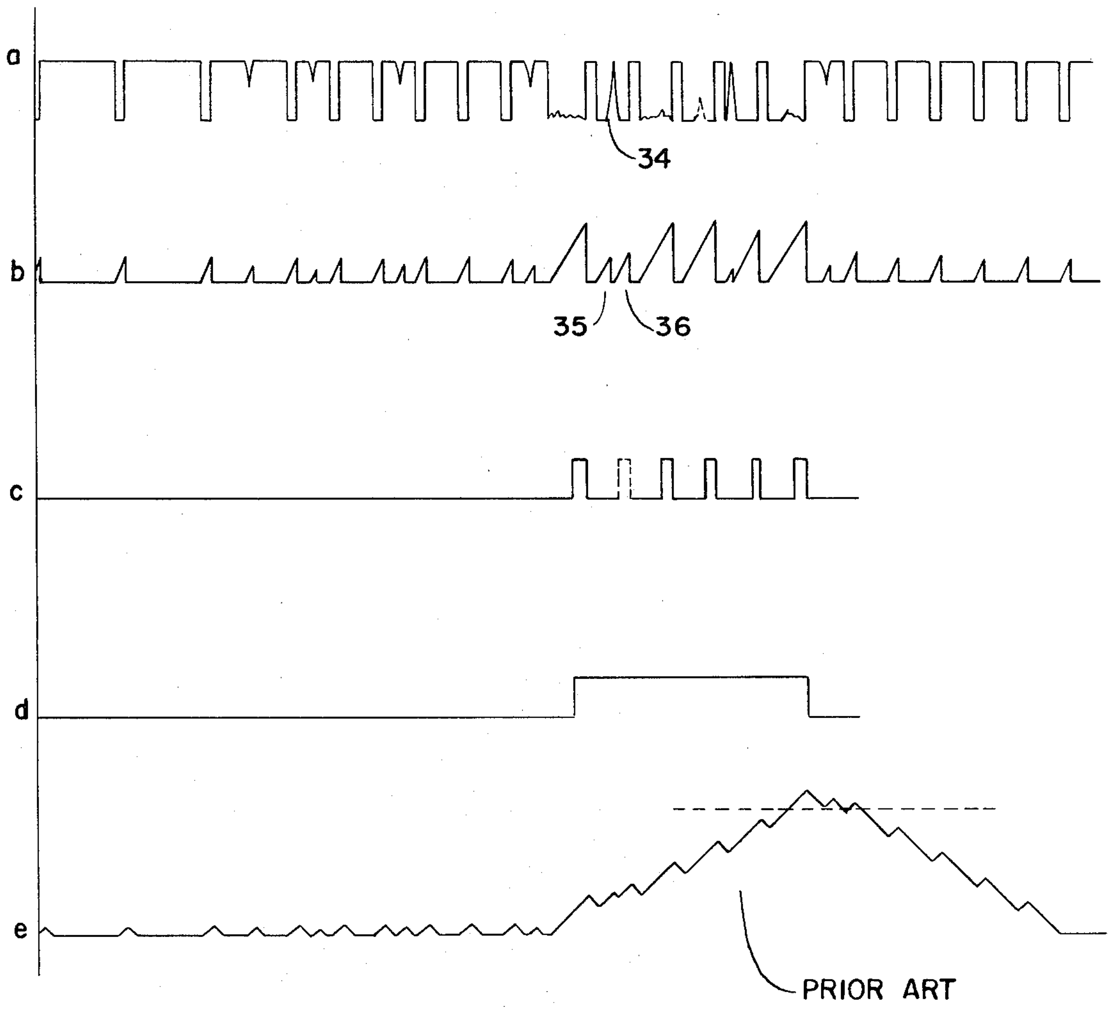
FIG. 3 is a diagram of a noisy input synchronizing signal and the waveforms generated by a prior art device and by the circuit of this invention.

Refer now to FIG. 3(*a*) which shows a noisy remote synchronizing signal. As shown, noise spikes are distributed throughout the sync signal in a random manner similar to that experienced at times in actual synchronizing signals being transmitted from one location to another. The ramp function generator 19 will initiate generation of a ramp function each time the sync pulse or a noise spike goes negative with respect to reference potential. Thus, as shown in FIG. 3(*b*), there are many more ramp functions being generated when the synchronization signal is noisy. Moreover, it will be noted that during the vertical sync interval when a noise component is sufficiently strong to return the sync signal to reference potential, the ramp function generation is terminated. Thus, as shown, the second serration 34 of the vertical sync interval has a noise resultant which reaches reference potential. The ramp function 35 initiated upon the start of the serration is therefore terminated. Once the sync signal starts back towards its negative peak potential again, the ramp function is again initiated but, since the time duration left before the next serration is short, the second ramp function 36 is not sufficiently great to reach the threshold level. Thus, during this serration interval, a pulse ordinarily generated when the sync signal is noiseless (represented by the dotted line in FIG. 3(*c*)) is not generated by comparator 21. Therefore, during this vertical sync interval, counter 25 will count only five pulses and, thus, will not generate an output pulse. Accordingly, no sync output will appear at terminal 33 of the locking circuit during this interval. The circuit, however, will continue to generate ramp functions and, upon the occurrence of the next vertical sync interval, will generate a plurality of pulses which may or may not be six in number. Upon the first occurrence of six consecutive pulses generated by comparator 21 within a 3H time interval, an output will occur at terminal 33 for locking the synchronization of equipment to that of the applied television signal.

FIG. 3(*e*) shows the waveform generated by a prior art integrating locking circuit. As shown, the point at which the integrating circuit output reaches threshold potential is varied from that when there is no noise in the incoming synchronization signal. Thus, the locking circuit will not be able to lock the locally generated timing signal to the supplied sync signal. Applicant's invention, however, generates a sync locking pulse only when six pulses are generated in comparator 21 during a well-defined interval of time, namely, the vertical sync interval time. Thus, the trailing edge of the locking pulse is always coincident with the trailing edge of the last vertical sync pulse thereby causing exact synchronization with an external signal.

It is sometimes desired that the horizontal lines of a television picture be advanced upwardly. This may be achieved by changing the threshold count level of counter 25. Thus, if program control circuit 31 supplied a signal to counter 25 instructing it to count to four rather than to six, the local broadcast signal will be synchronized to the external signal at the end of the fourth pulse generated by comparator 21. This time difference is one horizontal sync interval and, thus, horizontal scanning begins one horizontal time interval earlier than before. If the program control 31 is set to two, it feeds a signal to counter 25 instructing it to count to two. It thereby generates an output pulse after two pulses have been supplied thereto by comparator 21. Thus, the local sync signal is now advanced two horizontal time increments over the applied signal. Circuits for controlling the number of pulses a counter will count before recycling are well-known in the art and may be of any suitable type. This advance line provision is intended for relatively noise-free applications.

Thus, this invention discloses a means for synchronizing and locking television equipment with an externally generated television signal and for shifting or advancing the horizontal scan of a television signal by one or two horizontal time intervals.

It is understood that while a detailed description was given of the preferred embodiment, other embodiments may be used that come within the spirit of the invention as defined by the appended claims.

I claim:

1. An apparatus for deriving accurate vertical time reference signals from a composite television synchronization signal comprising:

first means for processing said composite television synchronization signal to provide first pulses corresponding to those pulses in said composite television synchronization signal having a width greater than the width of the horizontal synchronization and equalizing pulse components of said composite television synchronization signal, said first pulses thereby corresponding to the vertical synchronization pulse components of said composite television synchronization signal;

second means coupled to receive said first pulses for generating in response thereto a second pulse having a duration at least as great as the vertical synchronization pulse interval of said composite television synchronization signal;

pulse counter means, also coupled to receive said first pulses, for generating a third pulse in response to a predetermined plurality of said first pulses; and, coincidence gate means, coupled to receive said second pulse and said third pulse, for generating said vertical time reference signals in response to pulse coincidence of said second and third pulses.

2. The apparatus of claim 1 wherein said first means includes a means for generating a ramp function in response to each synchronization pulse in said composite television signal, said ramp function having its trailing edge coincident with the trailing edge of said synchronization pulse, and comparator means for generating a pulse each time said ramp function crosses a preset threshold potential, said generated pulse having a trailing edge coincedent with the trailing edge of said ramp function.

3. The apparatus of claim 2 wherein said pulse counter means for generating a third pulse generates a third pulse having a leading edge coincedent with the trailing edge of the vertical synchronization interval of said composite televisions signal.

4. The apparatus of claim 3 further comprising means for varying the count of said counter.

5. The apparatus of claim 4 wherein said count of said counter is set at four.

6. The apparatus of claim 5 wherein said count of said counter is set at two.

* * * * *

UNITED STATES PATENT OFFICE
CERTIFICATE OF CORRECTION

Patent No. 3,678,199 Dated July 18, 1972

Inventor(s) Buck C. Brown

It is certified that error appears in the above-identified patent and that said Letters Patent are hereby corrected as shown below:

Col. 6 (claim 3), line 2, after "pulse" (second occurrence) -- after counting six of said first pulses, said third pulse -- was omitted.

Signed and sealed this 24th day of October 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334